United States Patent [19]

St. Clair et al.

[11] 4,152,231

[45] May 1, 1979

[54] RADIATION CURED POLYDIENE BASED POLYMER COMPOSITION

[75] Inventors: David J. St. Clair; David R. Hansen, both of Houston, Tex.

[73] Assignee: Shell Oil Company, Houston, Tex.

[21] Appl. No.: 955,044

[22] Filed: Oct. 26, 1978

[51] Int. Cl.$^2$ ................................................ C08F 8/00
[52] U.S. Cl. .......................... 204/159.17; 204/159.14; 204/159.2; 260/27 BB; 260/33.6 UA; 260/876 B; 428/461; 428/483; 428/508
[58] Field of Search ............... 260/876 B; 204/159.14, 204/159.2, 159.17

[56] References Cited

U.S. PATENT DOCUMENTS

| | | | |
|---|---|---|---|
| 3,113,912 | 12/1963 | Kraus | 204/159.2 |
| 3,860,505 | 1/1975 | Tarney et al. | 204/159.12 |
| 3,936,365 | 2/1976 | Saunders et al. | 204/159.2 |
| 4,006,024 | 2/1977 | Ibata et al. | 96/115 R |
| 4,076,768 | 2/1978 | Saunders et al. | 260/876 B |
| 4,127,461 | 11/1978 | Paulen | 204/159.14 |

*Primary Examiner*—Richard B. Turer
*Attorney, Agent, or Firm*—Dean F. Vance

[57] ABSTRACT

A cured polymer composition possessing excellent cohesive strength at high temperatures along with good solvent resistance and processing characteristics is prepared by the radiation curing of a composition comprising a linear or radial polydiene, tackifying resin, and a di-to-tetra-functional acrylate or methacrylate selected from the group consisting of acrylic and methacrylic acid esters of polyols.

12 Claims, No Drawings

RADIATION CURED POLYDIENE BASED POLYMER COMPOSITION

BACKGROUND OF THE INVENTION

Styrene-diene block copolymers have been formulated in the past to produce a number of types of adhesive compositions. The basic patent in this field, Harlan, U.S. Pat. No. 3,239,478, shows combinations of these block copolymers with tackifying resins and paraffinic extending oils to produce a wide spectrum of adhesives. However, four serious limitations of these adhesive compositions are their relatively low service temperatures, poor ultraviolet (UV) resistance, poor solvent resistance and high viscosity. Generally, the highest temperature at which these styrene-diene block copolymers retain useful properties and act like a vulcanized rubber is limited by the softening temperature (Tg) of the styrene end block. Depending upon the molecular weight of the end blocks and the load, these block copolymers can begin to significantly creep or flow at 120°–180° F. For a number of applications it would be very advantageous to have higher service temperatures. For example, these adhesives would be useful in paint shops if the masking tapes produced had solvent resistance and a 225°–250° F. service temperature. They would also be useful as laminating adhesives in, for example, retortable food pouches if they could withstand boiling water temperatures and in furniture laminating adhesives if they could bear moderate loads at 250° F. In addition, although these adhesives can withstand very short contact with common solvents, prolonged contact with aromatic solvents or blends containing aromatic solvents will cause these adhesives to soften and lose cohesive strength. Further, the relatively high viscosity of these prior art styrene-diene block copolymers also limits their applicability ot certain end uses and certain machines for applying the adhesive to a substrate.

One means to improve the service temperature of these styrene-diene block copolymer adhesive compositions is to chemically cure the adhesive with a phenol formaldehyde resin and heat as disclosed in Korpman, U.S. Pat. No. 3,625,751. However, this procedure is undesirable because it is a very energy intensive process to heat the adhesive after it has been applied to the backing. Also, this process cannot be used on heat sensitive backing such as plastics because the backing melts at the temperatures required to cure the adhesive. A more energy efficient process is the radiation initiated cure disclosed in Hendricks, U.S. Pat. No. 2,956,904. Compositions disclosed, however, did not contain a supplemental crosslink promoting ingredient and therefore, as will be shown here, do not give satisfactory results under commercially acceptable conditions.

A new polymer composition that can be easily cured has now been found.

CROSS REFERENCE TO COPENDING APPLICATION

The present invention is related to the invention disclosed in the copending patent application, Ser. No. 883,118, filed on Mar. 3, 1978, now patent 4,133,731 entitled High Temperature Adhesive Composition, and having the same inventors and same assignee.

SUMMARY OF THE INVENTION

The present invention broadly encompasses a cured polymer composition possessing excellent high temperature cohesive strength along with excellent shear strength, UV resistance and solvent resistance. In addition, by selecting the appropriate base polymer, the composition may be processed as a liquid at moderate or room temperature. This is an important consideration in that it then becomes possible to use less expensive equipment also resulting in no air pollution and reduced energy requirements. Broadly, the cured composition of the present invention is prepared by the radiation curing of a blend comprising:

(a) 100 parts by weight of a linear or radial conjugated diene polymer selected from the group consisting of homopolymers of $C_{4-12}$ conjugated dienes, copolymers of two or more $C_{4-12}$ conjugated dienes, and their hydrogenated derivatives;

(b) about 0 to about 250 parts by weight of a tackifying resin; and (c) about 1 to about 100 parts by weight of a di-to-tetrafunctional acrylate or methacrylate selected from the group consisting of the acrylic and methacrylic acid esters of polyols. Additional components may be present in the composition including, among others, plasticizers such as rubber compounding oils or liquid resins, fillers, antioxidants, and the like.

DETAILED DESCRIPTION OF THE INVENTION

One of the key components of the present invention is the base polymer employed. In copending application Ser. No. 883,118, the base polymer is a non-hydrogenated monoalkenyl arene-diene block copolymer. The polymers of the present invention are conjugated diene polymers and do not contain end blocks of monoalkenyl arene polymers. Broadly, the polymers employed herein include linear or radial homopolymers of $C_{4-12}$ conjugated dienes and linear or radial copolymers of 2 or more $C_{4-12}$ conjugated dienes. Also contemplated are the hydrogenated versions of these homopolymers and copolymers. In addition, the claims of the present invention also encompass those block copolymers of conjugated dienes and monoalkenyl arenes wherein the monoalkenyl arene blocks are non-terminal blocks, i.e., where the polymer blocks of mono-alkenyl arene are directly attached to the coupling agent residue or nucleus, or are otherwise non-terminal and not located on the free end of the polymer chain. When the polymer contains a monoalkenyl arene such as styrene, the percent of monoalkenyl arene is generally less than about 50% by weight.

The base polymers employed herein are generally produced by the process comprising the following reaction steps:

(a) polymerizing one or more conjugated dienes in solution in the presence of an ionic initiator to form a living polymer; and (b) reacting the living polymer with a multifunctional coupling agent to form a linear or radial or star-shaped polymer.

Alternatively, linear homopolymers may be made without a coupling agent and linear copolymers may be made without a coupling agent by the sequential addition of the desired monomers into the reaction vessel according to the following polymerization techniques.

As is well-known, living polymers may be prepared by the anionic solution polymerization of conjugated dienes in the presence of an alkali metal or an alkali-metal hydrocarbon, e.g. sodium naphthalene, as anionic initiator. The preferred initiator is lithium or a monolithium hydrocarbon. Suitable lithium hydrocarbons include unsaturated compounds such as allyl lithium, methallyl lithium; aromatic compounds such as phenyllithium, the tolyllithiums, the xylyllithiums and the naphthyllithiums and in particular the alkyl lithiums such as methyllithium, ethyllithium, propyllithium, butyllithium, amyllithium, hexyllithium, 2-ethylhexyllithium and n-hexadecyllithium. Secondary butyllithium is the preferred initiator. The initiators may be added to the polymerization mixture in one or more stages optionally together with additional monomer. The living polymers are olefinically unsaturated.

The living polymers obtained by reaction step (a), which are linear unsaturated living polymers, are prepared from one or more conjugated dienes, e.g. $C_4$ to $C_{12}$ conjugated dienes. Specific examples of suitable conjugated dienes include butadiene (1,3-butadiene); isoprene; 1,3-pentadiene (piperylene); 2,3-dimethyl-1,3-butadiene; 3-butyl-1,3-octadiene, 1-phenyl-1,3-butadiene; 1,3-hexadiene; and 4-ethyl-1,3-hexadiene with butadiene and/or isoprene being preferred.

The living polymers may be living homopolymers, living copolymers, living terpolymers, living tetrapolymers, etc. The living homopolymers may be represented by the formula A—M, wherein M is an ionic group, e.g. lithium, and A is polybutadiene, polyisoprene or the like. Living polymers of isoprene are the preferred living homopolymers. The living copolymers may be represented by the formula A—B—M, wherein A—B is a block, random or tapered copolymer such as poly(butadiene/isoprene). Such formulae, without further restriction, do not place a restriction on the arrangement of the monomers within the living polymers. For example, living poly(isoprene/butadiene) copolymers may be living polyisoprene-polybutadiene block copolymers, living poly(isoprene/butadiene) random copolymers, or living poly(isoprene/butadiene) tapered copolymers. As an example of a living terpolymer may be mentioned living poly(isoprene/butadiene/isoprene)-terpolymers.

As stated above, the living copolymers may be living block copolymers, living random copolymers or living tapered copolymers. The living block copolymers may be prepared by the step-wise polymerization of the monomers e.g. by polymerizing isoprene to form living polyisoprene followed by the addition of the other monomer, e.g. butadiene, to form a living block copolymer having the formula polyisoprene-polybutadiene-M, or butadiene may be polymerized first to form living polybutadiene followed by addition of isoprene to form a living block copolymer having the formula polybutadiene-polyisoprene-M.

The living random copolymers may be prepared by adding gradually the most reactive monomer to the polymerization reaction mixture, comprising either the less reactive monomer or a mixture of the monomers, in order that the molar ratio of the monomers present in the polymerization mixture be kept at a controlled level. It is also possible to achieve this randomization by gradually adding a mixture of the monomers to be copolymerized to the polymerization mixture. Living random copolymers may also be prepared by carrying out the polymerization in the presence of a so-called randomizer. Randomizers are polar compounds which do not deactivate the catalyst and bring about a tendency to random copolymerization. Suitable randomizers are tertiary amines, such as trimethylamine, triethylamine, dimethylethylamine, tri-n-propylamine, tri-n-butylamine, dimethylaniline, pyridine, quinoline, N-ethylpiperidine, N-methylmorpholine; thioethers, such as dimethyl sulphide, diethyl sulphide, di-n-propyl sulphide, di-n-butyl sulphide, methyl ethyl sulphide; and in particular ethers, such as dimethyl ether, methyl ethyl ether, diethyl ether, di-n-propyl ether, di-n-butyl ether, di-octyl ether, di-benzyl ether, diphenyl ether, anisole, 1,2-dimethyloxyethane, o-dimethoxy benzene, and cyclic ethers such as tetrahydrofuran.

Living tapered copolymers are prepared by polymerizing a mixture of monomers and result from the difference in reactivity between the monomers. For example, if monomer A is more reactive than monomer B then the composition of the copolymer gradually changes from that of nearly pure poly-A to that of nearly pure poly-B. Therefore, in each living copolymer molecule three regions can be discerned, which gradually pass into each other, and which have no sharp boundaries. One of the outer regions consists nearly completely of units derived from monomer A and contains only small amounts of units derived from monomer B, in the middle region the relative amount of units derived from monomer B greatly increases and the relative amount of units derived from monomer A decreases, while the outer region consists nearly completely of units derived from monomer B and contains only small amounts of units derived from monomer A. Living tapered copolymers of butadiene and isoprene are preferred living tapered polymers.

The solvents in which the living polymers are formed are inert liquid solvents such as hydrocarbons e.g. aliphatic hydrocarbons, such as pentane, hexane, heptane, octane, 2-ethylhexane, nonane, decane, cyclohexane, methylcyclohexane or aromatic hydrocarbons e.g. benzene, toluene, ethylbenzene, the xylenes, diethylbenzenes, propylbenzenes. Cyclohexane is preferred. Mixtures of hydrocarbons may also be used.

The temperature at which the polymerization is carried out may vary between wide limits such as from $-50°$ C. to $150°$ C., preferably frm about 20 to about $80°$ C. The reaction is suitably carried out in an inert atmosphere such as nitrogen and may be carried out under pressure, e.g. a pressure of from about 0.5 to about 10 bars.

The concentration of the initiator used to prepare the living polymer may also vary between wide limits and is determined by the desired molecular weight of the living polymer.

The molecular weight of the living polymers prepared in reaction step (a) may vary between wide limits. Suitable number average molecular weights are from about 5,000 to about 250,000 with number average molecular weights of from about 15,000 to about 150,000 being preferred.

The living polymers produced in reaction step (a) are then typically reacted, in reaction step (b), with a multifunctional coupling agent. Multifunctional coupling agents include, among others, dihaloalkanes such as disclosed in G.B. No. 1,014,999, the polyepoxides, polyisocyanates, polyimines, polyaldehydes, polyketones, polyanhydrides, polyesters, and polyhalides disclosed in U.S. Pat. No. 3,281,383; the silicon halides and the like disclosed in U.S. Pat. No. 3,244,664; the diesters disclosed in U.S. Pat. No. 3,594,452; and the polyalkenyl coupling agents disclosed in U.S. Pat. No. 3,985,830. These polyalkenyl coupling agents are usually compounds having at least two non-conjugated alkenyl groups. Such groups are usually attached to the same or different electron-withdrawing groups e.g. an aromatic nucleus. Such compounds have the property that at least two of the alkenyl groups are capable of independent reaction with different living polymers and in this respect are different from conventional conjugated diene polymerizable monomers such as butadiene, isoprene etc. Pure or technical grade polyalkenyl coupling agents may be used. Such compounds may be aliphatic, aromatic or heterocyclic. Examples of aliphatic compounds include the polyvinyl and polyallyl acetylenes, diacetylenes, phosphates and phosphites as well as the dimethacrylates, e.g. ethylene dimethyacrylate. Examples of suitable heretocyclic compounds include divinyl pyridine and divinyl thiophene. The preferred coupling agents are the polyalkenyl aromatic compounds and the most preferred are the polyvinyl aromatic compounds. Examples of such compounds include those aromatic compounds, e.g. benzene, toluene, xylene, anthracene, naphthalene and durene which are substituted by at least two alkenyl groups preferably directly attached thereto. Examples include the polyvinyl benzenes e.g. divinyl, trivinyl and tetravinyl benzenes; divinyl, trivinyl and tetravinyl ortho-, meta- and para-xylenes, divinyl naphthalene, divinyl ethyl benzene, divinyl biphenyl, diisobutenyl benzene, diisopropenyl benzene and diisopropenyl biphenyl. The preferred aromatic compounds are represented by the formula: $A-(CH=CH_2)_x$ wherein A is an optionally substituted aromatic nucleus and x is an integer of at least 2. Divinyl benzene, in particular metadivinyl benzene, is the most preferred aromatic compound. Pure or technical grade divinylbenzene (containing various amounts of other monomers, e.g. styrene and ethyl styrene) may be used.

The amount of multifunctional coupling agent added may vary between wide limits but perferably at least 0.5 mole is used per mole of unsaturated living polymer. Amounts of from 1 to 15 moles, preferably from 1.5 to 5 moles are preferred. The amount, which may be added in two or more stages, is usually such so as to convert at least 80 or 85%w of the living polymers into linear or radial or star-shaped polymers.

The reaction step (b) may be carried out in the same solvent as for reaction step (a). A list of suitable solvents is given above. The reaction step (b) temperature may also vary between wide limits e.g. from 0° to 150° C., preferably from 20° to 120° C. The reaction may also take place in an inert atmosphere e.g. nitrogen and under pressure e.g. a pressure of from 0.5 to 10 bars.

The polymers prepared in reaction step (b) are characterized by having a center or nucleus of the coupling agent or residue and a number of arms of substantially linear unsaturated polymers extending outwardly therefrom. The number of arms may vary considerably but is typically between 2 and 30, preferably from about 7 to about 15. Star-shaped homopolymers may be represented by the formula $A-x-(A)_n$ and star-shaped copolymers may be represented by the formula $A-B-x-(B-A)_n$ wherein n is an integer, usually between 2 and 30 and x is the coupling agent nucleus. From the above it can be seen that x is preferably a poly(polyvinyl aromatic coupling agent)nucleus and more preferably a poly(divinylbenzene)nucleus. Linear homopolymers may be represented by the formula $A-x-A$ and linear copolymers may be represented by the formula $A-B-x-B-A$.

Particularly preferred in this invention are coupled polymers of the type $(I)_n$, $(B)_n$ or $(B-I)_n$ where n is greater than 2 (I is an isoprene block and B is a butadiene block). Coupled polymers of this type allow one to increase molecular weight with only modest increase in viscosity. This results in a polymer which can be processed as easily as a relatively low molecular weight polymer but which can be crosslinked as readily as a high molecular weight polymer. Multi-armed, coupled polymers should also result in better adhesives than linear homopolymers. When a linear homopolymer is crosslinked, its modulus will increase and result in a reduction in tack of the adhesive. However, if a coupled polydiene having 10 arms is used in the adhesive, it is only required that 2 of the arms of each molecule be crosslinked to other molecules to form a crosslinked network. Since the other 8 arms remain uncrosslinked, the adhesive modulus should remain low and the crosslinked adhesive should retain good tack. Coupled polymers of the $(B-I)_n$ type have the additional advantage that the crosslinking ingredient may preferentially concentrate in the B (butadiene) phase where it is needed. Thus, lower concentration of crosslinking ingredient should be required and crosslinking can be better controlled.

The molecular weights of the polymer may vary between relatively wide limits. However, an important aspect of the present invention is that star-shaped polymers possessing good viscosity characteristics may be produced even though the polymers have very high molecular weights. It is possible to produce star polymers having peak molecular weights between about 25,000 and about 1,250,000. Preferred molecular weights are 100,000 to 500,000. These peak molecular weights are determined by gel permeation chromotography (GPC) on a polystyrene scale.

As stated above, the polymers may also be hydrogenated by any suitable technique. Suitably at least 80%, preferably 90 to about 98% of the original olefinic unsaturation is hydrogenated.

The hydrogenation can be carried out in any desired way. A measured catalyst may be used e.g. a copper or molybdenum compound. Compounds containing noble metals or nobel-metal compounds can be used as hydrogenation catalysts. Preference is given to catalysts containing a non-noble metal or a compound thereof of Group VIII of the Periodic Table i.e. iron, cobalt and in particular, nickel. As examples may be mentioned, Raney nickel and nickel on kieselguhr. Special preference is given to hydrogenation catalysts which are obtained by causing metal hydrocarbyl compounds to react with organic compounds of any one of the group VIII metals iron, cobalt or nickel, the latter compounds containing at least one organic compound which is attached to the metal atom by means of an oxygen atom, for instance as described in U.K patent specification No. 1,030,306. Preference is given to hydrogenation catalysts obtained by causing an aluminum trialkyl (e.g. aluminum triethyl (Al(Et)$_3$) or aluminum triisobutyl) to react with a nickel salt of an organic acid (e.g. nickel diisopropyl salicylate, nickel naphthenate, nickel 2-ethyl hexanoate, nickel di-tert-butyl benzoate, nickel salts of saturated monocarboxylic acids obtained by reaction of olefins having from 4 to 20 carbon atoms in the molecule with carbon monoxide and water in the presence of acid catalysts) or with nickel enolates or phenolates (e.g. nickel acetonylacetonate or the nickel salt of butylacetophenone).

The hydrogenation of the polymer is very suitable conducted in solution in a solvent which is inert during the hydrogenation reaction. Saturated hydrocarbons and mixtures of saturated hydrocarbons are very suitable and it is of advantage to carry out the hydrogenation in the same solvent in which the polymerization has been effected.

A much preferred hydrogenation process is the selective hydrogenation process shown in Wald et al, U.S. Pat. No. 3,595,942. In that process, hydrogenation is conducted, preferably in the same solvent in which the polymer was prepared, utilizing a catalyst comprising the reaction product of an aluminum alkyl and a nickel or cobalt carboxylate or alkoxide. A favored catalyst is the reaction product formed from triethyl aluminum and nickel octoate.

The base polymer component by itself lacks the required adhesion for certain end-use applications. Therefore, it is often necessary to add an adhesion promoting or tackifying resin. A common tackifying resin is a diene-olefin copolymer of piperylene and 2-methyl-2-butene having a softening point of about 95° C. This resin is available commercially under the tradename Wingtack 95, and is prepared by the cationic polymerization of 60% piperylene, 10% isoprene, 5% cyclopentadiene, 15% 2-methyl-2-butene and about 10% dimer. See U.S. Pat. No. 3,577,398. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C. and about 115° C. Other adhesion promoting resis which are also useful in the compositions of this invention include hydrogenated resins, esters of rosins, polyterpenes, terpenephenol resins, and polymerized mixed olefins. For best UV resistance, it is preferred that the tackifying resin be a saturated resin, e.g. a hydrogenated resin such as Escorez 5380 made by EXXON.

The amount of adhesion promoting resin employed varies from about 0 to about 250 parts by weight per hundred parts rubber (phr), preferably between about 25 and about 250 phr, more preferably between about 50 to about 150 phr.

The compositions of the instant invention also may contain plasticizers such as rubber extending or compounding oils or liquid resins. These rubber compounding oils are well-known in the art and include both high saturates content and high aromatics content oils. The amount of rubber compounding oil employed varies from 0 to about 100 phr, preferably about 10 to about 60 phr.

An essential component of the present invention is the di-to-tetra-functional acrylate or methacrylate coupling agent which promotes crosslinking of the base polymer during exposure to the radiation. The coupling agents employed herein are di-, tri-, and tetra-functional acrylates and methacrylates selected from the group consisting of the acrylic and methacrylic acid esters of polyols. Preferred coupling agents include 1,6-hexane diol diacrylate (HDODA), 1,6-hexane diol dimethacrylate (HDODM), trimethylolpropane triacrylate (TMPTA), trimethylolpropane trimethacrylate (TMPTM), pentaerythritol tetracrylate (PTA), and pentaerythritol tetramethacrylate (PTM). Other useful acrylates and methacrylates include pentaerythritol triacrylate, dipentaerythritol monohydroxy penta/acrylate, 1,3-butylene glycol diacrylate, 1,4-butene diol diacrylate, 2,2-dimethyl propane 1,3-diacrylate (neopentyl glycol diacrylate), diethylene glycol diacrylate, diallyl fumarate, allyl methacrylate, 1,3-butylene glycol dimethacrylate, ethylene glycol dimethacrylate, diethylene glycol dimethacrylate, triethylene glycol dimethacrylate, tetraethylene glycol dimethacrylate, polyethylene glycol dimethyacrylate, and ethoxylated bisphenol A dimethacrylate. Must preferred coupling agents are TMPTA and TMPTM with TMPTM being the most preferred. The amount of coupling agent employed varies from about 1 phr to about 100 phr, preferably about 5 phr to about 25 phr.

The compositions of this invention may be modified with supplementary materials including pigments, fillers, and the like as well as stabilizers and oxidation inhibitors.

The adhesive compositions of the present invention may be applied to the substrate from a solution of up to about 40% weight solids of the ingredients in a solvent such as toluene, the solvent being removed by evaporation prior to crosslinking by exposure to the radiation. Alternatively, the ingredients may be mixed in a solvent, the mixture may be emulsified and the solvent evaporated, and the adhesive may be applied to the substrate as a 60–70% weight solids water-based emulsion, the water being removed by evaporation prior to crosslinking. Adhesives of the present invention are especially suited for preparation as 100% solids hot melt adhesives since they give adequate processing viscosities, and good pot live, up to several hours, at processing temperatures of about 150° C. A preferred method for processing these adhesives to minimize gel formation during hot melt processing is to use an extruder to mix the adhesive and feed the coating die as is disclosed in Korpman U.S. Pat. No. 3,984,509. In a much preferred embodiment, the base polymer is selected such that the adhesive prior to crosslinking is a liquid at room or ambient temperatures. Accordingly, the adhesive may be applied to the substrate without the necessity of heating the polymer.

The compositions of the present invention are cured by exposure to high energy radiation such as electron beam radiation or ultraviolet radiation. Electron beam is preferred since it can initiate crosslinking of compositions based on either an unhydrogenated or a hydrogenated polymer while UV radiation can initiate crosslinking of compositions based only on a unhydrogenated polymer.

The electron beam radiation or high energy ionizing radiation which is employed to effect the crosslinking reaction can be obtained from any suitable source such as an atomic pile, a resonant transformer accelerator, a Van de Graaf electron accelerator, a Linac electron accelerator, a betatron, a synchrotron, a cyclotron, or the like. Radiation from these sources will produce ionizing radiation such as electrons, protons, neutrons, deuterons, gamma rays, X rays, alpha particles, and beta particles.

The crosslinking reaction is conveniently effected at room temperature, but it can be conducted at depressed or elevated temperatures if desired. It is also within the spirit and scope of the invention to effect the crosslinking reaction within the confines of an inert atmosphere to prevent oxidative degradation of the block copolymer.

The amount of radiation required depends primarily upon the type and concentration of acrylate or methacrylate employed and the level of curing desired. Suitable doses of electron beam radiation include 1 megarad to about 20 megarads, preferably about 2 megarads to about 10 megarads. Suitable UV radiation doses are those received by a 1.5 mil thick adhesive passing under a medium pressure mercury lamp rated at 200 watts per inch at line speeds of about 10 to about 800 feet per minute, the preferred range being 25 to 400 feet per minute.

When using ultraviolet radiation it is necessary to employ a photosensitizer in order to speed up the crosslinking reaction. Useful photosensitizers are benzophenone, propiophenone, cyclopropyl phenyl ketone, acetophenone, 1.3.5-triacetyl benzene, benzaldehyde, thioxanthane, anthraquinone, beta-naphthyl phenyl ketone, beta-naphthaldehyde, beta-acetonaphthone, 2.3-pentanedione, benzil, fluoronone, pyrene, benzanthrone, and anthracene. While most of these are well-known photosensitizers, other photosensitizers, responsive to UV radiation, would work equally well in the present invention. The present invention is not to be limited to specific photosensitizers.

In a preferred embodiment, the UV radiation is filtered to remove most of the radiation having a wavelength of less than about 310 nanometers. It has been shown in associated tests that exposure to the shorter wavelength (less than 310 nanometers), higher energy portion of the UV light may cause degradation of the adhesive surface. Alternatively, one may employ a lamp having the appropriate spectral output.

A preferred use of the present formulation is in the preparation of pressure-sensitive adhesive tapes or in the manufacture of labels. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes. Alternatively, when the amount of tackifying resin is zero, the compositions of the present invention may be used for molded goods and the like.

The invention is further illustrated by means of the following illustrative embodiments, which are given for the purpose of illustration only and are not meant to limit the invention to the particular reactants and amounts disclosed.

The high temperature cohesive strength of the irradiated adhesive compositions was measurered by a Strippability Temperature Limit (STL) test. STL is defined as the maximum temperature at which a tape can be rapidly peeled from a hot, stainless steel substrate without leaving an adhesive residue on the panel. The test is run by applying a quarter inch wide strip of tape to a stainless steel panel whose temperature is controlled to give a temperature gradient of about 30° F. per inch between 100° F. and 450° F. Following a 30 second warmup, the tape is stripped off manually at high speed and at approximately a 90° angle. The equipment used is a Heizbank type 184321 melting point tester from the Reichert Company, vienna, Austria. The temperature at which massive cohesive failure occurs is recorded as the STL value in all following tables. The STL test measures whether an automotive masking tape can be removed cleanly when it is stripped from a painted car as it leaves the paint baking ovens.

Gel refers to the appearance of the rubber in the adhesive after about one square inch of tape has soaked in toluene for about 24 hours. If the adhesive is not chemically crosslinked, it will dissolve and there will be no gel. If it is only lightly crosslinked, it will not completely dissolve and a rather loose gel structure will be found. If the adhesive is properly crosslinked the rubber will be tightly gelled. The thickness of the swollen gel can be used as a measure of the degree of crosslinking. In this application, gel is rated as none (n), loose (L) or tight (T).

Holding power (HP) is defined as a time required for a ½"×½" area of tape adhered to steel to fall under a load of 2 kg applied in shear at a 2 degree antipeel. The method is Pressure Sensitive Tape Council Method #7.

Rolling Ball Tack (RBT) is defined as the distance a small steel ball rolls in an adhesive film with a standard initial velocity. Small numbers indicate aggressive tack. The method is Pressure Sensitive Tape Council Method #6.

Polyken Probe Tack (PBT) is defined as the stress required to separate the end of a steel rod from the adhesive film. Polyken Probe Tack conditions are 1 centimeter per second probe speed, 100 grams per square centimeter probe pressure and 1 second dwell time. The method is ASTM D2979.

In all embodiments, the adhesive composition was prepared in a toluene solution and applied as about a 1.5 mil dry adhesive layer to a 1 mil Mylar substrate. Electron beam irradiation was accomplished under a nitrogen blanket using an 18 inch wide ELECTROCURTAIN® PROCESSOR manufactured by Energy Sciences, Inc. Ultraviolet irradiation was accomplished using a UV Processor (QC 1202 N/A) supplied by Radiation Polymer Co. This unit has two medium pressure mercury lamps, each rated at 200 watts per inch.

The base polymer employed was a star-shaped homopolyisoprene prepared by coupling 75,000 molecular weight living polyisoprene arms with a divinylbenzene coupling agent. Only 6% of the polyisoprene remained uncoupled, and the coupled molecular weight was about 800,000. This indicates that on the average there were between 10 and 11 arms per molecule.

ILLUSTRATIVE EMBODIMENT I

In Illustrative Embodiment I, various formulations were subjected to varying doses of electron beam radiation. The results are presented below in Table I. Results of the Gel test show that significant crosslinking occurred in formulation D at only a 1 Mrad dose. Although this implies improved solvent resistance, the adhesive was not sufficiently crosslinked to give the desired improvement in STL. After a 2 Mrad dose, Formulation D showed both good STL and Gel results. These results demonstrate the beneficial effect of adding 10 phr TMPTM in that good STL and Gel results can be obtained at only a 2 Mrad dose.

TABLE I

| PROPERTIES OF ELECTRON CURED PSA ON STAR POLYISOPRENE | | | | | |
|---|---|---|---|---|---|
| Radiation Dose, Mrad | Property[a] | A | B | C | D |
| 0 | STL | <120 | — | <120 | — |
|   | RBT | 2 | — | 1 | — |
| 1 | STL | — | — | <120 | <120 |
|   | Gel | None | None | None | Loose |

TABLE I-continued
PROPERTIES OF ELECTRON CURED PSA ON STAR POLYISOPRENE

| Radiation Dose, Mrad | Property[a] | A | B | C | D |
|---|---|---|---|---|---|
| 2 | STL | <120 | <120 | <120 | >400 |
|   | Gel | None | None | Loose | Loose |
| 5 | STL | >400 | >400 | >400 | >400 |
|   | Gel | Loose | Loose | Loose | Loose |
|   | RBT | 2 | 2 | 5 | 7 |
| Formulation |  |  |  |  |  |
| Star Polyisoprene |  | 100 | 100 | 100 | 100 |
| Wingtack 95 |  | 80 | 80 | 80 | 80 |
| Butyl Zimate[b] |  | 2 | 2 | 2 | 2 |
| TMPTM[c] |  | 0 | 1 | 3 | 10 |

[a]STL - Strippability Temperature Limit, ° F.
RBT - Rolling Ball Tack, cm
Gel - Solubility of Irradiated Adhesive in Toluene
[b]Zinc dibutyldithiocarbomate
[c]TMPTM - Trimethylolpropane trimethacrylate

ILLUSTRATIVE EMBODIMENT II

Illustrative Embodiment II shows the beneficial results obtained by the UV irradiation of the present adhesives. The results are shown below in Table II. Results show that the control adhesives, Formulation A, has very poor STL, Gel and holding power. After crosslinking this adhesive containing 25 phr TMPTA and 3 phr of photoinitiator by exposure to UV radiation, good adhesive properties were ground. Results on this crosslinked adhesive, Formulation B, show that it has good STL, Gel and tack along with moderate holding power. The UV radiation used to crosslink the adhesive was filtered to remove most radiation of less than 310 nanometers.

TABLE II
Properties of UV Cured PSA Based on Star Polyisoprene

| Formulation[a] Properties | A Unirradiated | B Irradiated by UV[b] |
|---|---|---|
| Strippability Temp. Limit, ° F. | <120 | >400 |
| Gel | None | Tight |
| Rolling Ball Tack, cm | 2 | 4 |
| Polyken Probe Tack, Kg | 0.4 | 0.4 |
| Holding Power to Steel (½ × ½ inch, 2Kg), minutes | <1[c] | 210 |
| [a] Formulation | A | B |
| Star Polyisoprene | 100 | 100 |
| Wingtack 95 | 80 | 80 |
| Trimethylolpropane triacrylate | 0 | 25 |
| Diethoxyacetophenone | 0 | 3 |

[b] Exposed under nitrogen to UV radiation from two medium pressure mercury lamps, each 200 watts/inch. Sample irradiated by 4 passes under lamps at 50 feet per minute (equivalent line speed 12.5 feet per minute). UV light from lamps was filtered through 1 mil thick Mylar to filter out most of radiation of wavelength <310 nanameters.

[c] Sample failed by cohesive failure of the adhesive.

What is claimed is:

1. A cured composition possessing good processability, solvent resistance and high temperature cohesive strength prepared by the radiation curing of a polymer composition in an inert atmosphere, said polymer composition comprising:
   (a) 100 parts by weight of a linear or radial conjugated diene polymer selected from the group consisting of homopolymers of $C_4$-$C_{12}$ conjugated dienes, copolymers of two or more $C_4$-$C_{12}$ conjugated dienes, and the hydrogenated derivatives thereof;
   (b) about 0 to about 250 parts by weight of a tackifying resin; and
   (c) about 1 to about 100 parts by weight of a di- to tetrafunctional acrylate or methacrylate selected from the group consisting of the acrylic and methacrylic acid esters of polyols.

2. A composition according to claim 1 wherein said acrylate or methacrylate is selected from the group consisting of 1,6-hexane diol diacrylate, 1,6-hexane diol dimethacrylate, trimethylolpropane triacrylate, trimethylolpropane trimethacrylate, pentaerythritol tetracrylate, and pentaerythritol tetramethacrylate.

3. A composition according to claim 2 wherein said methacrylate is trimethylolpropane trimethacrylate.

4. A composition according to claim 1 wherein the type of radiation cure is electron beam irradiation.

5. A composition according to claim 4 wherein the amount of radiation employed is between about 1 and about 50 megarads.

6. A composition according to claim 5 wherein the amount of radiation employed is between about 2 and about 25 megarads.

7. A composition according to claim 1 wherein the type of radiation cure is ultraviolet irradiation.

8. A composition according to claim 1 also including a photosensitizer.

9. A composition according to claim 1 wherein the conjugated diene polymer is a radial homopolymer having the formula A—x—(A)$_n$ where A is a homopolymer block of a conjugated diene, x is the coupling residue and n is greater than 7.

10. A composition according to claim 9 wherein A is a homopolyisoprene block.

11. A composition according to claim 1 wherein the conjugated diene polymer is a radial copolymer having the formula B—C—x—(C—B)$_n$ were C and B are polymer blocks of different conjugated dienes, x is the coupling residue, and n is greater than 7.

12. A composition according to claim 1 wherein the diene polymer also contains less than about 50 percent of a non-terminal monoalkenyl arene polymer block.

* * * * *